July 24, 1962  R. A. RABER, JR  3,046,419
PULSE GENERATING APPARATUS
Filed Sept. 24, 1959

Inventor:
Robert A. Raber Jr.,
by Allen E. Amgott
His Attorney.

United States Patent Office 3,046,419
Patented July 24, 1962

3,046,419
PULSE GENERATING APPARATUS
Robert A. Raber, Jr., East Berne, N.Y., assignor to General Electric Company, a corporation of New York
Filed Sept. 24, 1959, Ser. No. 842,041
7 Claims. (Cl. 307—106)

The present invention relates generally to pulse generators and more particularly to magnetic modulators capable of producing a plurality of pulse repetition rates from a single frequency alternator.

In the past, magnetic modulators have been designed for producing pulse repetition rates usable in radar systems. However, in such devices, whenever there was a requirement that the frequency be changed, the supply frequency or alternator employed with the magnetic modulator also had to be changed to generate the different frequency. This entailed the substitution of one alternator for another in order to attain the desired repetition rate required for a particular application.

The present invention overcomes this disadvantage of requiring a plurality of alternators when changes in the pulse repetition rate are desired. In particular, applicant's invention provides means for selecting a pulse repetition rate which is any submultiple of the supply frequency. In brief, applicant's invention comprises a plurality of saturable reactors energized from a single alternator to provide a plurality of pulse repetition rates equal to $$f, \frac{f}{2}, \frac{f}{3}$$

etc., where $f$ is the supply frequency of the alternator.

One object of the present invention is to provide a magnetic modulator capable of producing different pulse repetition rates from a single frequency alternator.

Another object of the present invention is to provide means for selecting a pulse repetition rate that is any submultiple of the supply frequency.

A further object of the invention is to provide a magnetic modulator of the "square loop" type that is operable from a single supply alternator to obtain a plurality of pulse repetition rates.

Figure 1:
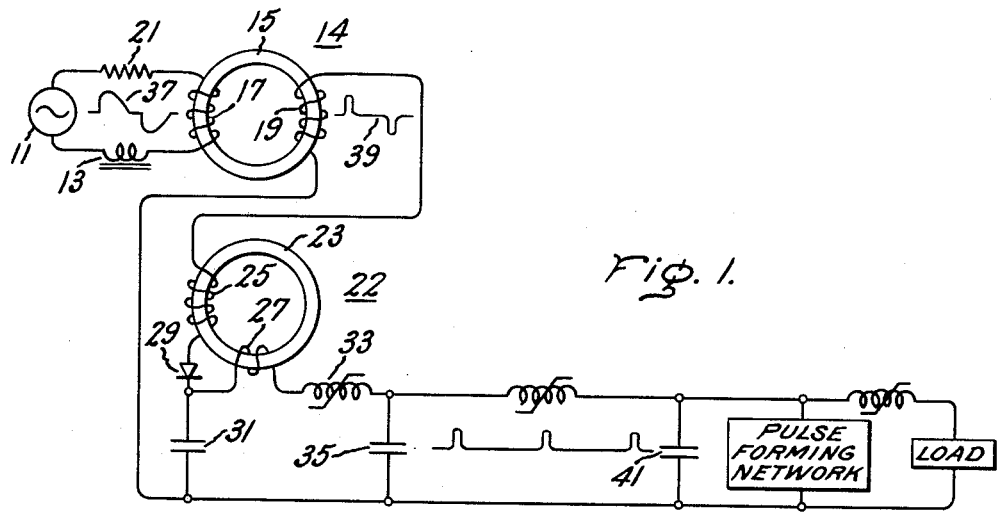
Figure 2:
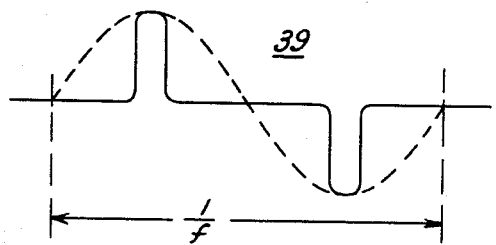

Other objects and many of the attendant advantages of the invention will be readily appreciated as the same becomes better understood with reference to the following detailed description when considered in connection with the accompanying drawings wherein:

FIGURE 1 is a schematic wiring diagram of one embodiment of the present invention; and FIGURE 2 is an enlarged pictorial representation of a pulse wave form generated within the magnetic modulator of FIGURE 1.

In the embodiment illustrated in FIGURE 1 there is shown a source of power such as an alternator 11 generating a voltage having a supply frequency designated as $f$. A saturable reactor hereinafter referred to as a pulse generating reactor 14 comprising a core 15, a first or input winding 17 and a second or output winding 19 wound thereon is connected in circuit with said alternator by means of a series circuit including a resistor 21 and saturating reactor 13. It is to be observed that pulse generating reactor 14 acts as an isolation and step-up transformer in addition to pulse generation.

A second reactor hereinafter referred to as a repetition rate controlling reactor 22 comprising a core 23, a first winding 25 and a second winding 27 wound thereon is connected in circuit with the pulse generating reactor 14. One end of output winding 19 of pulse generating reactor 14 is connected directly to one end of winding 25 of repetition rate controlling reactor 22. The opposite ends of windings 19 and 25 are connected by means of a series circuit including a rectifier 29 and a capacitor 31.

One end of winding 27 of repetition rate controlling reactor 22 is connected to the junction 30 between rectifier 29 and capacitor 31. The other end of winding 27 is serially connected to a saturating reactor hereinafter referred to as a magnetic modulator switching reactor 33. A capacitor 35 is connected between the other end of switching reactor 33 and the junction of capacitor 31 and winding 19.

In operation, when the source of power or alternator 11 producing a voltage having a frequency $f$ is turned on, there will be applied across winding 17 of the pulse generating reactor 14, a pulse waveform as shown at 37 in the drawing. Pulse generating reactor 14 saturates during the cycle and transforms this voltage waveform 37 into a form indicated generally by 39, and to a voltage of the required amplitude. It will be recognized by those skilled in the art that the values of saturating reactor 13, pulse generating reactor 14 and resistor 21 determine the shape of the waveforms indicated by 37 and 39.

In FIGURE 2 there is shown an enlarged view of the waveform indicated by numeral 39 which appears across winding 19 of pulse generating reactor 14. This waveform has the same frequency $f$ as that generated by the alternator 11. The waveform 39 derived across winding 19 is further operated upon by the repetition rate controlling reactor 22. Said reactor contains core material of the "square loop" type and is so designed that a controllable number of positive pulses will occur before a following positive pulse is allowed to pass and charge capacitor 31. Rectifier 29 acts to prevent passage of any negative pulses.

It will be recognized by those skilled in the art that the circuitry including capacitor 31, winding 27, switching reactor 33 and capacitor 35 is that of a conventional pulse modulator circuit modified to the extent that winding 27 is serially connected with the first switching reactor 33. This modified circuitry is used so that the current due to each pulse delivered to the load will reset the controlling reactor 22 to the starting condition by means of capacitor 31. The discharge current of said capacitor will "reset" the magnetic flux in the core 23 of controlling reactor 22.

It is to be observed that capacitor 31 acts at a temporary energy storing device until switching reactor 33 saturates, permitting the energy to be transferred to the capacitor 35. The size of capacitor 31 is determined by the remaining components of the modulator and this size must result in narrowing the voltage pulse transmitted rather than lengthening the pulses of voltage to derive better D.C. filtering.

From the above it will be obvious that the supply frequency $f$ is divided into a pulse repetition rate equal to $$f, \frac{f}{2}, \frac{f}{3}$$

etc. By placing a suitable resistance across rectifier 29 (not shown) to utilize the negative pulses for adjustable resetting, a method of control is provided to determine the proper pulse repetition rate desired. Another method for controlling the desired pulse repetition rate can be accomplished by providing selectable taps (not shown) on the winding 25 of controlling reactor 22 or by providing an external reset by means of an additional winding on core 22.

The particular embodiment illustrated in FIGURE 1 permits the building of a magnetic pulse modulator that has inherent reliability and freedom from maintenance without sacrificing the ability to use a number of pulse repetition rates. Thus, only one alternator of a certain frequency can be used to supply the modulator. In addition, a repetition rate equal to twice the supply frequency of the alternator could also be obtained by rectification of the negative pulses appearing across coil 19.

While a particular embodiment of the invention has been shown and described herein, it is not intended that the invention be limited to such disclosure, but that changes and modifications can be made and incorporated within the scope of the claims.

What is claimed is:

1. A pulse generating circuit for producing a pulse repetition rate that is any submultiple of the frequency of a source of power comprising means including at least one reactor energized from said source of power to derive pulses of constant and equal volt-time areas, storage means coupled to said reactor, means including a second reactor means and rectifying means coupled to said first reactor means and storage means for controlling the rate at which said storage means is charged so that a controllable number of positive pulses will occur before a following positive pulse is allowed to pass to said storage means, and pulse forming network means coupled to said second reactor means to produce a pulse repetition rate equal to any submultiple of the frequency of the source of power.

2. A pulse generating circuit for producing a pulse repetition rate that is any submultiple of the frequency of a source of power comprising means including first reactor means energized from such source of power to provide an amplified waveform having the same frequency as said source of power, means including second reactor means and storage means coupled to said first reactor means for transforming the amplified waveform from said first reactor means to charge said storage means, and pulse forming network means coupled to said second reactor means to produce a pulse repetition rate equal to any submultiple of the frequency of the source of power.

3. A pulse generating circuit for producing a pulse repetition rate that is any submultiple of the frequency of a source of power comprising means including first reactor means for producing a pulse output that has the same frequency as the frequency of said source of power, storage means coupled to said reactor, and means including reactor means coupled to said first reactor and said storage means for controlling the rate at which said storage means is charged so that a controllable number of positive pulses will occur before a following positive pulse is allowed to pass to said storage means.

4. A pulse generating circuit for producing a pulse repetition rate that is any submultiple of the frequency of the source of power comprising means including a first reactor means for producing a series of pulses having the same frequency as the frequency of the source of power, storage means coupled to said first reactor mean, means including saturable reactor means and rectifier means coupled to said first reactor means and said storage means for controlling the rate at which said storage means is permitted to be charged, and pulse forming network means coupled to said storage means and said second reactor means to produce a pulse repetition rate equal to any submultiple of the frequency of the source of power.

5. In combination with a pulse forming network including a plurality of switching reactors in parallel with a plurality of capacitors, means for producing a pulse repetition rate that is a submultiple of the frequency of a source of power including at least two magnetic cores each having a pair of windings thereon, a capacitor in circuit with one winding of each of said magnetic cores for storing a charge, and means including rectifier means and an inductance coupled to the windings of said two magnetic cores and said pulse forming network to periodically discharge said capacitor into said pulse forming network.

6. In combination with a pulse forming network including a plurality of switching reactors in parallel with a plurality of capacitors, means for producing a pulse repetition rate that is a submultiple of the frequency of a source of power comprising means including at least one reactor means, storage means coupled to said reactor means and said pulse forming network, and means including rectifier means coupled to said storage means and said pulse forming network for controlling the rate at which said storage means is charged.

7. A circuit for generating pulses to produce a pulse repetition rate that is any submultiple of the frequency of a source of power comprising means including a reactor for producing pulses of constant and equal volt-time area from said supply frequency, storage means coupled to said reactor, a load circuit, and means including a reactor of the "square loop" type and rectifying means in circuit with said storage means and load circuit to supply pulses to said load circuit having a pulse repetition rate equal to any submultiple of the frequency of the source of power.

References Cited in the file of this patent

UNITED STATES PATENTS

| | | |
|---|---|---|
| 2,705,287 | Lo | Mar. 29, 1955 |
| 2,807,730 | Kaufmann | Sept. 24, 1957 |